United States Patent [19]

Clerc et al.

[11] 4,407,870

[45] Oct. 4, 1983

[54] PROCESS FOR POSITIONING THE LIQUID MEDIUM IN A LIQUID MEDIUM CELL AND A CORRESPONDING CELL

[75] Inventors: Jean F. Clerc, Meylan; Francoise Vinet, Grenoble, both of France

[73] Assignee: Commissariat a l'Energie Atomique, France

[21] Appl. No.: 377,588

[22] Filed: May 12, 1982

[51] Int. Cl.³ .............................. C09K 3/34; G02F 1/13
[52] U.S. Cl. ........................................ 428/1; 350/330; 350/334; 350/343
[58] Field of Search .................... 428/1; 350/330, 334, 350/340, 341, 343

[56] References Cited

U.S. PATENT DOCUMENTS

| | | | |
|---|---|---|---|
| 3,995,941 | 12/1976 | Nagahara et al. | 350/343 |
| 4,013,344 | 3/1977 | Bescond | 350/334 |
| 4,091,847 | 5/1978 | Sorkin | 428/1 |
| 4,105,298 | 8/1978 | Levine et al. | 428/1 |
| 4,224,093 | 9/1980 | Kohyama et al. | 428/1 |
| 4,273,420 | 6/1981 | Watanabe et al. | 428/1 |
| 4,297,401 | 10/1981 | Chern et al. | 428/1 |

FOREIGN PATENT DOCUMENTS

| | | |
|---|---|---|
| 2011220 | 10/1970 | Fed. Rep. of Germany . |
| 2191135 | 2/1974 | France . |
| 2225068 | 10/1974 | France . |

OTHER PUBLICATIONS

Kahn et al., "Surface Produced Alignment of Liquid Crystals", *Proceedings of the IEEE* vol. 61, #7, Jul. 1973, pp. 823–828.

*Primary Examiner*—William R. Dixon, Jr.

[57] ABSTRACT

The invention relates to a process for positioning the liquid medium in a liquid medium cell and to a corresponding cell.

The cell comprises a liquid medium placed between two walls kept spaced from one another, e.g. by shims, and joined along the edge thereof, wherein it comprises first means for producing a first surface tension force in a first area and second means for producing a second surface tension force in a second area, the first surface tension force being higher the the second surface tension force, said means serving to correctly position the liquid medium between the two walls, the liquid medium then being located in the first area and outside the second area.

10 Claims, 3 Drawing Figures

PROCESS FOR POSITIONING THE LIQUID MEDIUM IN A LIQUID MEDIUM CELL AND A CORRESPONDING CELL

BACKGROUND OF THE INVENTION

The present invention relates to a process for positioning the liquid medium in a liquid medium cell and to a corresponding cell. It is used in optoelectronics and particularly in the production of a screen for displaying pictures and/or alphanumeric data.

Such a cell comprises a liquid medium placed between two flat walls, which are generally thin compared with their transverse dimensions and which are generally made from glass, whilst being kept spaced from one another. The two walls are joined to one another in the vicinity of their edges by means of resins or other appropriate binders making it possible to lock them in the correct position. The two walls can be kept at a particular spacing from one another e.g. by means of shims, which are in particular arranged along the welded edges or are distributed as uniformly as possible between the two walls. It can also be obtained by using rigid walls, e.g. as a result of their relatively great thickness.

In the display field, the most commonly used liquid medium is a liquid crystal which, as its name indicates, has in the liquid state properties characteristic of solid crystals and in particular with regards to the anisotropy.

In general, to obtain a satisfactory operation of the cell, its entire useful area must be filled with liquid medium. However, it is known that during the filling of the cell with liquid medium, gas bubbles appear within the cell. These gas bubbles must be positioned at a point within the cell, which is not liable to prejudice the operation thereof. Thus, the presence of gas bubbles in the useful area of the cell can be particularly prejudicial, when the cell ia used in the display of images and/or alphanumeric data.

BRIEF SUMMARY OF THE INVENTION

The problem of the present invention is a process making it possible to position the liquid medium contained in a cell solely in the useful area of said cell, so that the gas bubbles can be located in the non-useful area thereof. It also relates to a corresponding liquid medium cell.

More specifically, the present invention relates to a cell of the aforementioned type, wherein it comprises first means for producing in a first area a first surface tension force and second means for producing in a second area a second surface tension force, the first surface tension force being higher than the second surface tension force, the means for producing the different surface tension forces serving to correctly position the liquid medium between the two walls, the liquid medium then being located at least partly in the first area and at least partly outside the second area.

In the cell, the liquid medium used is preferably a liquid crystal.

According to a preferred embodiment of the cell, the means for producing the different surface tension forces are constituted by two materials covering the surfaces of walls facing the liquid medium, one of the materials being more wetting and the other less wetting, the wetting material leading to the highest surface tension force and the non-wetting material leading to the lowest surface tension force.

According to another preferred embodiment of the invention, the means for producing the different surface tension forces are constituted by the walls of the cell defining two regions of different thicknesses, the smallest thickness region leading to the highest surface tension force and the largest thickness region leading to the smallest surface tension force.

The invention also relates to a process for positioning the liquid medium in a cell of the type described hereinbefore, wherein before joining the two walls, the facing wall surfaces are covered with two materials having different surface tensions, in such a way that after filling the cell with liquid medium, the area occupied by the liquid medium is located outside the material having the lowest surface tension and the area occupied by the liquid medium must be positioned to the right of the material having the highest surface tension.

According to another embodiment of the process according to the invention, walls defining two regions of different thicknesses are used, in such a way that after filling the cell with liquid medium, the area occupied by the liquid medium is outside the largest thickness region and the area occupied by the liquid medium is located to the right of the smallest thickness region.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
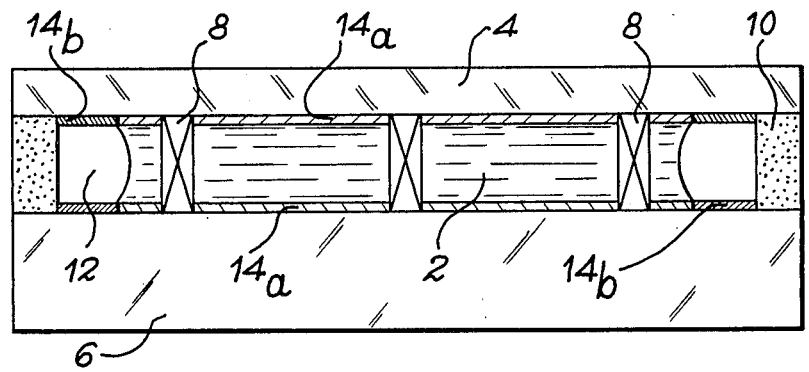
FIG. 1 a sectional view of a liquid medium cell according to a first variant.

FIG. 1 is a sectional view of a liquid medium cell constituted by a liquid medium 2, which can be a liquid crystal, placed between two parallel flat walls 4 and 6. The two flat glass walls 4 and 6 are kept spaced from one another by means of constant thickness shims 8, regularly distributed between the two walls. Walls 4, 6 are joined to one another by means of a weld 10 made in the vicinity of the edges of the walls. Weld 10, which acts as a sealing wall, can be produced by means of resins or by screen process printing of fusible glass.

Figure 2:
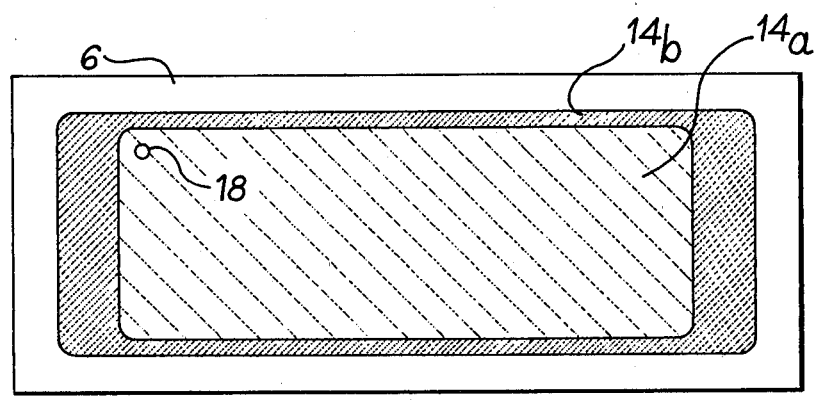
FIG. 2 a plan view of the cell of FIG. 1.

Such a liquid crystal cell is produced by placing constant thickness shims 8 on e.g. one of the walls by any known means. The wall provided with the shims is made to face the other wall in such a way that the shims are located between the two walls. Finally, the two walls 4, 6 are joined together by weld 10 and the cell is filled with liquid medium 2 through an adequate opening 18 (FIG. 2). During the filling of the cell, a gas pocket 12 or gas bubbles appear within the cell.

According to the invention, in order to position the liquid medium in the useful area of the cell, e.g. in its centre and consequently position the gas pocket in the non-useful area of the cell, such as e.g. on the periphery thereof, the surfaces of the facing walls 4 and 6 are covered with two materials 14a, 14b having different surface tensions.

FIG. 2 is a plan view of the cell showing the respective positions of the two materials 14a, 14b. Material 14a having the highest surface tension and which is also called a wetting material is placed in the centre of the surfaces of facing walls 4 and 6 in such a way that liquid medium 2 occupies the central area of the cell. Wetting medium 14a attracts the liquid medium towards it. Conversely, material 14b having the lowest surface tension and also called non-wetting material, can be placed on the periphery of the cell on the surface of said facing walls in such a way that the area occupied by the liquid medium is outside the said material 14b, which exerts little or no attraction on theliquid medium. Therefore, gas pocket 12 is expelled opposite to material 14b, i.e. outside material 14a.

In the case of a cell used for the display of images and/or alphanumeric data, gas pocket 12 can be located outside the useful area for the display and the liquid medium to the right of said useful area.

Material 14a having the highest surface tension is, for example, a material chosen from the group including lecithin, siloxanes of formula $SiO_n$, resins of the alkyl benzene sulphonate type known under the abbreviation ABS resins and resins known under the abbreviation DMOAP.

The material 14b having the lowest surface tension is, for example, a fluoric material such as carbon fluoride or magnesium fluoride.

According to another variant of the process for the positioning of the liquid medium inthe liquid medium cell, walls 4 and 6 are used, which define between them regions of different thicknesses, i.e. the cell has two different thicknesses.

Figure 3:
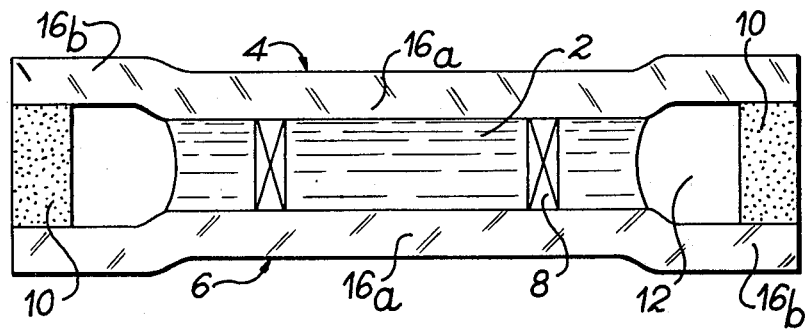
FIG. 3 a sectional view of a liquid medium cell according to a second variant.

By means of a sectional view of the cell, FIG. 3 shows a possible location for these two regions. Region 16a corresponding to the smallest thickness of the cell and consequently to the highest surface tension (Jurin's law) attracts the liquid medium 2 towards it. Thus, the area occupied by the liquid medium is located to the right of region 16a, such as e.g. in the central area of the cell if said region 16a is located in the centre of the cell. Conversely, region 16b, corresponding to the greatest thickness of the cell and consequently to the lowest surface tension, exerts little attraction on the liquid medium. Therefore, the area occupied by the liquid medium is positioned outside region 16b, whilst the gas pocket is located to the right of said medium 16b, such as e.g. at the periphery of the cell if region 16b is located at the periphery of the cell.

To facilitate understanding, regions 16a and 16b have been deliberately exaggerated in FIG. 3.

It is obviously possible to use a cell in which only a single wall defines regions 16a and 16b, the other wall being strictly flat.

What is claimed is:

1. A cell comprising a liquid medium placed between two walls kept spaced from one another, the walls being joined to one another along their edge, wherein it comprises first means for producing in a first area a first surface tension force and second means for producing in a second area a second surface tension force, the first surface tension force being higher than the second surface tension force, the means for producing the different surface tension forces serving to correctly position the liquid medium between the two walls, the liquid medium then being located at least partly in the first area and at least partly outside the second area.

2. A cell according to claim 1, wherein the means for producing the different surface tension forces are constituted by two materials covering the surfaces of walls facing the liquid medium, one of the materials being more wetting and the other less wetting, the wetting material leading to the highest surface tension force and the non-wetting material leading to the lowest surface tension force.

3. A cell according to claims 1 or 2, wherein the means for producing the different surface tension forces are constituted by the walls of the cell defining two regions of different thicknesses, the smallest thickness region leading to the highest surface tension force and the largest thickness region leading to the smallest surface tension force.

4. A cell according to claim 1, wherein the liquid medium is a liquid crystal.

5. A cell according to claim 2, wherein the material having the lowest surface tension is a fluoric material.

6. A cell according to claim 5, wherein the fluoric material is chosen from the group including carbon fluoride and magnesium fluoride.

7. A cell according to claim 2, wherein the material having the highest surface tension is chosen from the group including lecithin, siloxanes, resins of the alkyl benzene sulphonate type and resins known under the abbreviation DMOAP.

8. A process for positioning the liquid medium in a cell according to claim 2, wherein before joining the two walls, the facing wall surfaces are covered with two materials having different surface tensions, in such a way that after filling the cell with liquid medium, the area occupied by the liquid medium is located outside the material having the lowest surface tension and the area occupied by the liquid medium must be positioned to the right of the material having the highest surface tension.

9. A process for positioning a liquid medium in a cell according to claim 3, wherein walls defining two regions of different thicknesses are used, in such a way that after filling the cell with liquid medium, the area occupied by the liquid medium is outside the largest thickness region and the area occupied by the liquid medium is located to the right of the smallest thickness region.

10. An application of the process according to the claims 8 or 9 to the locating of gas pockets appearing during the operation of a display cell outside the display areas.

* * * * *